United States Patent
Porikli et al.

(10) Patent No.: US 8,942,467 B2
(45) Date of Patent: Jan. 27, 2015

(54) METHOD FOR REDUCING BLOCKING ARTIFACTS IN IMAGES

(75) Inventors: Fatih Porikli, Watertown, MA (US); Yi Wang, St. Paul, MN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 299 days.

(21) Appl. No.: 13/428,554

(22) Filed: Mar. 23, 2012

(65) Prior Publication Data

US 2013/0251245 A1 Sep. 26, 2013

(51) Int. Cl.
*G06K 9/62* (2006.01)

(52) U.S. Cl.
USPC .......................................................... 382/159

(58) Field of Classification Search
CPC .................. H04N 19/00975; H04N 19/00909; H04N 19/00993; G06K 9/36; G06K 9/62
See application file for complete search history.

(56) References Cited

U.S. PATENT DOCUMENTS

2008/0317358 A1* 12/2008 Bressan et al. ................ 382/224
2011/0026811 A1*  2/2011 Kameyama ................... 382/159

OTHER PUBLICATIONS

Farinella, Giovanni, "On the Application of Structured Sparse Model Selection to JPEG Compressed Images", Image Processing Laboratory, Department of Math and Computer Science, University of Catania.*
Computational Color Imaging, Third Internation Workshop, CCIW 2011, Milan, Italy, Apr. 20-21, 2011 Proceedings.*
Mancera, Luis, "Image De-Quantizing via Enforcing Sparseness in Overcomplete Representation", Visual Information Processing Group, 2006.*
Guoshen Yu et al. "Image Modeling and Enhancement via Structured Sparse Model Selection," Proceedings of the 17th International Conf. on Image Processing, Hong Kong, China, Sep. 26-29, 2010.
GM Farinella et al. "On the Application of Structured Sparse Model Selection on JPEG Compressed Image," Proceedings of the Third International Workshop on Computational Color Imaging, Milan, Italy, Apr. 20-21, 2011.
Yi Wang et al. "Multiple Dictionary Learning for Blocking Artifacts Reduction," 2012 IEEE International Conference on Acoustics, Speech and Signal Processing, Kyoto, Japan, Mar. 25-30, 2012.

* cited by examiner

*Primary Examiner* — Chan Park
*Assistant Examiner* — Elisa Rice
(74) *Attorney, Agent, or Firm* — Dirk Brinkman; Gene Vinokur

(57) ABSTRACT

Blocking artifacts are reduced by projecting each patch obtained from an input image onto a set of bases vectors to determine multiple representations for each patch. The set of bases vectors are learned from a training image, and the bases vectors include a full basis vector, and one or two subspace bases vectors. An optimal basis vector is determined in the set of bases vectors for each patch according to the projection. A threshold is applied to coefficients of the optimal basis vector to determine a filtered representation for each patch, and a reconstructed patch is generated using the filtered representation. Then, the aggregating the reconstructed patches are aggregated to produce an output image.

15 Claims, 8 Drawing Sheets

METHOD FOR REDUCING BLOCKING ARTIFACTS IN IMAGES

FIELD OF THE INVENTION

This invention relates generally to image processing, and more particularly to reducing blocking artifacts in images, and moreover, artifacts in images reconstructed from compressed images.

BACKGROUND OF THE INVENTION

Blocking Artifacts Caused by Image Compression

Many image compression methods are based on block transform coding. These include still image compression procedures, such as JPEG, and video compression procedures, such as MPEG and H.264/AVC.

Block transform coding can cause blocking artifacts due to quantization errors at boundaries of blocks. Blocking effects are considered the most annoying artifacts of compressed images, and can dramatically degrade a visual quality especially when the images are encoded at high compression rates. The compression techniques in most coding standards cause high frequency quantization errors in individual blocks of pixels, resulting in discontinuities at block boundaries. To achieve high quality image compression using block based transform codes, the reduction of blocking artifacts in decompressed output images is critical.

Several methods post-process compressed images to improve the visual quality. Some methods analyze a spatial domain in the image, while others analyze a frequency domain. There also are iterative methods based on projections onto convex sets. In addition, processing images can adaptively reduce artifacts, while preserving edges. A large number of methods that reduce blocking artifacts include: projections onto convex sets (POCS), spatial block boundary filtering, wavelet filtering methods, statistical modeling methods, and constrained optimization methods.

Some of the more effective deblocking techniques are based on shifted transforms. That technique was first used with the re-application of shifted JPEG coded images.

Shifted transform procedures can improve the visual quality over conventional techniques based on POCS, and wavelet transforms. In the simplified version of the shifted JPEG transform, the transform operator is a discrete cosine transform (DCT) in the spatial and frequency domains. A filter operator is a combined quantization and dequantization process based on a quantization matrix. An averaging process is an unweighted average of the inverse shifted images. An improved weighted averaging scheme can adapt to the input image content.

Those methods tend to be computational complex, and have an explicit dependency on correct image gradient information. Those methods are also sensitive to preset parameters.

Dictionary Learning

Dictionary learning constructs an over-complete bases and represents image patches sparsely using these bases. Sparsity is a term of art in signal and data processing, where any zero coefficients in signals or data are substantially larger than the number of non-zero-coefficients.

Dictionary learning constructs a dictionary D and a reconstruction coefficient matrix $A(i, j)$ by minimizing $$\|X - DA\|_F^2 + \lambda \|A\|_1,$$

where $$\|A\|_1 := \sum_{i,j} |A(i, j)|,$$

$\lambda$ is a Lagrangian multiplier to determine the weighted sum of fidelity and sparsity terms. Columns of X represent patches of an image, and F is the Frobenius norm. Each column is a vectorized patch. Dictionary learning provides solutions for compression, denoising and other inverse problems in image processing. Some methods use group structures for dictionary learning.

SUMMARY OF THE INVENTION

The embodiments of the invention provide a method for reducing blocking artifacts, while reconstructing images.

The method is uses a projection onto orthogonal bases. The deblocking does not blur edges in the output images, or makes assumption about image gradients.

Instead of using a single full (over-complete) basis as in the prior art, the method learns two bases for vertical and horizontal patterns, in conjunction with a full basis, which can be determine using a DCT.

When the image patch (i.e., the texture of the block) matches one of the bases, when using a maximum number of coefficients for that basis, the corresponding response is stronger, and that basis is selected to represent the reconstructed patch.

In this manner, multiple representations of all patches in the compressed image are determined, and aggregated to obtain the output reconstructed image. Because the blocking artifacts are relatively small in magnitude, in comparison to the number of image edges, aggregation efficiently removes the artifacts but retains the image gradients.

Topological basis parameterizations and adaptation are part of the method.

BRIEF DESCRIPTION OF THE DRAWINGS

FIG. 5 includes example input and output images.

DETAILED DESCRIPTION OF THE PREFERRED EMBODIMENTS

The embodiments of the invention provide a method for reducing blocking artifacts in compressed input images, while reconstructing decompressed output images. It is well known that compression techniques in most coding standards cause high frequency quantization errors, resulting in discontinuities at block boundaries as disturbing visual artifacts.

Figure 1A:
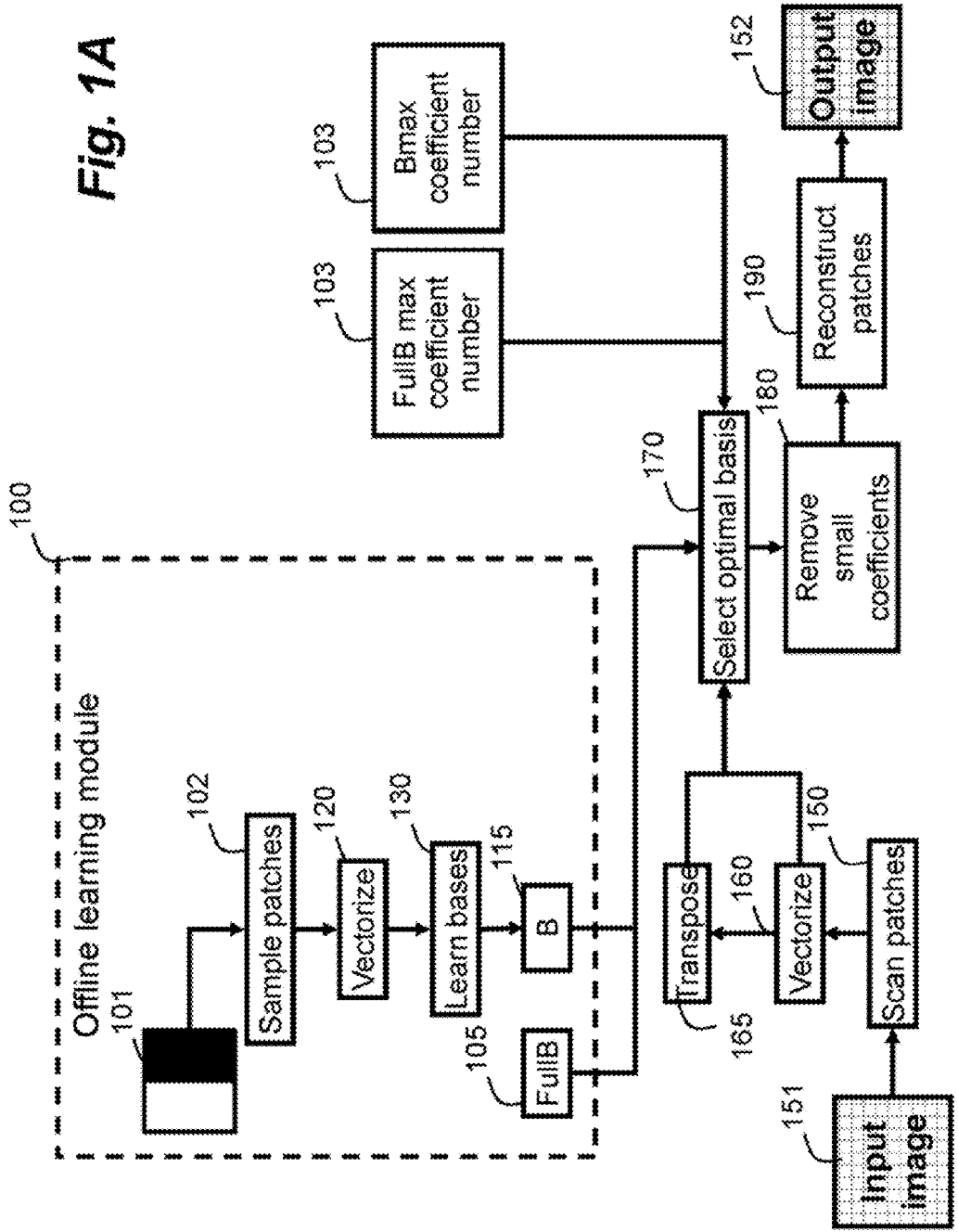
FIGS. 1A-1D. 1 are flow diagrams of an offline dictionary learning module used by embodiments of the invention.

FIG. 1A shows an offline learning module 100. The module constructs, from patches in a single training image, a single subspace basis 115 from a training image 101, and a full basis 105. In other embodiment shown in FIGS. 1B-1D, the offline module constructs two subspace bases vectors from the single training image. The steps of the offline module can be performed, one time, prior to online reconstruction and deblocking. As defined herein, a subspace is a set of vectors under addition and scalar multiplication. The subspace is defined by the basis that is a set of linearly independent vectors. A subspace can also be defined by a set of dictionary vectors that are linearly dependent. We normalize the basis vectors and dictionary vectors such that their norms are equal to one.

In other words, the set of bases we use includes a full bases, and either one or two subspace bases.

Figure 2:
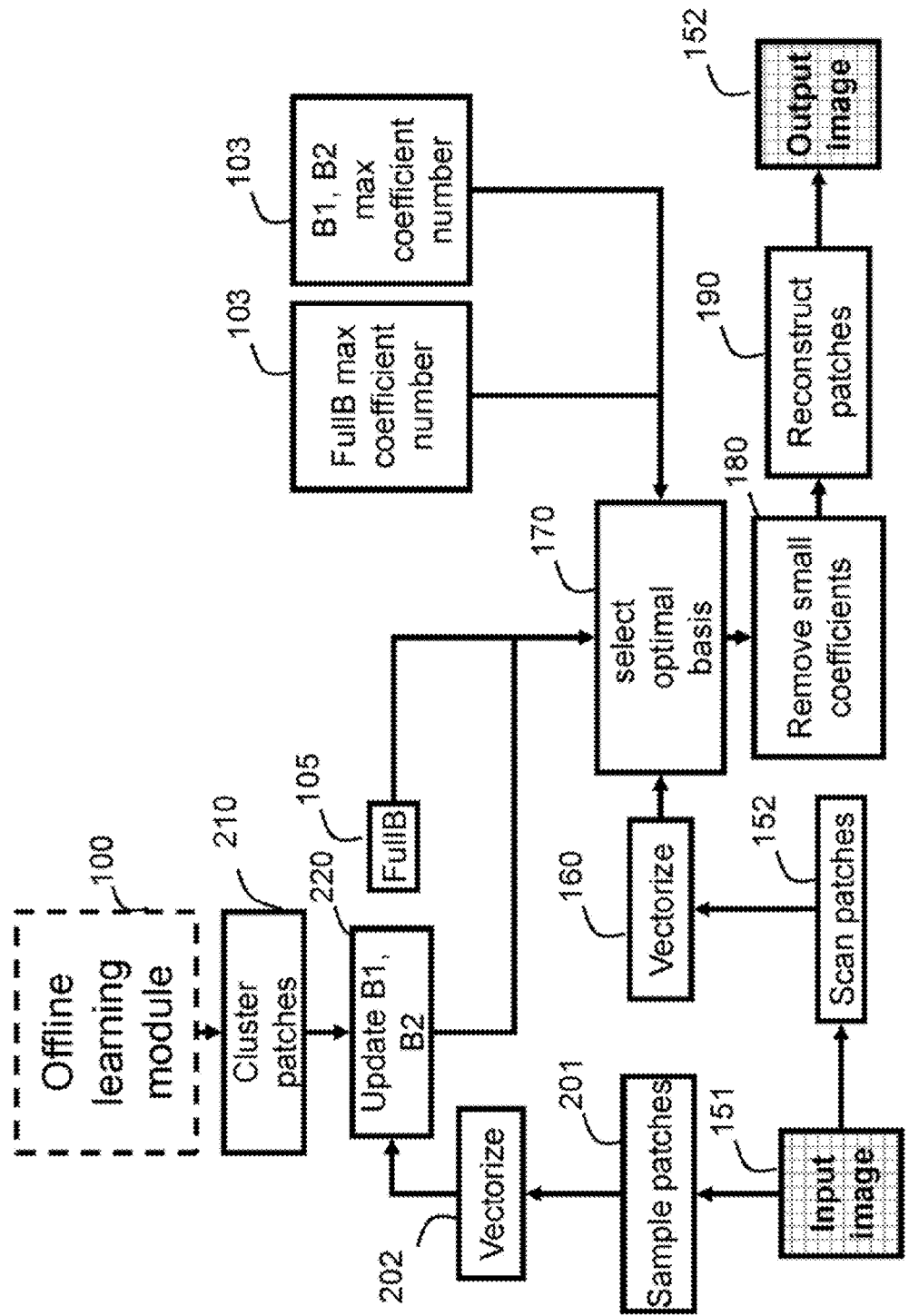
FIG. 2 is a flow diagram of a method for reducing blocking artifacts in compressed images.

The focus of FIG. 2 is on the reconstruction. The steps of the method in the offline and online modules can be performed in a processor connected to memory and input/output interfaces as known in the art.

Single Subspace Basis Learning

Figure 4:
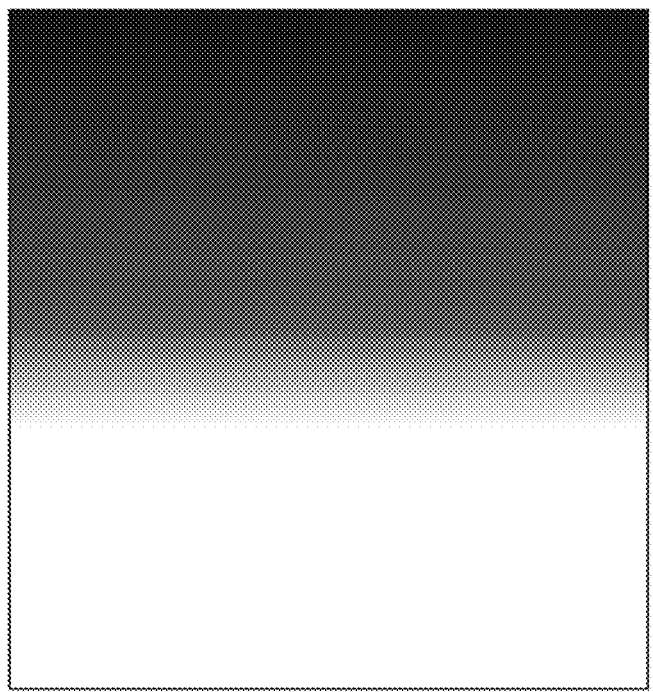
FIG. 4 is a training image.

During the offline processing 100, we learn a single basis B 115 from the single training image 101, see FIG. 4 for example. The training image is a "step" image, meaning, pixel each column have identical intensities, and the intensities in the columns increase along the rows.

The training image is depicted as a binary "step" image at either vertical (or horizontal) orientation. In other words, the intensities of the pixels in each columns is the same, but some columns have different intensities. For example, half of the training image has a first intensity value, which is different from the other half. The size of the training image is larger than the block size (8×8) of the compressed image. Block size can be larger depending on the compression parameters. Since the basis we learn is orthogonal, the actual intensity values of the training image can be different.

We sample multiple, random, overlapping, 8×8 blocks 101-102 from the training image 101. Each sample patch 102 is vectorized 120, and we learn 130 the bases.

For convenience, a patch usually corresponds to a 8×8 block of pixels. However, patches of other dimensions and shapes can also be used by the embodiments of the invention.

Pixels of a sampled block are ordered into a pixel vector where each coefficient corresponds to a pixel by using a fixed scan order, for instance zig-zag scanning of the pixels in the block. The scanning during training is identical to the scanning 150 used during image reconstruction, as is the vectorization 160 and transpose 165.

We then arrange the pixel vectors into a training matrix where the number of matrix rows, k, is the size of the pixel vector (in other words, the number of pixels in the patch) and the number of matrix columns is the number of patches.

We learn a basis from the training matrix. We initialize k basis vectors with the pixel vectors patches selected from the training image. This selection can be done randomly. We then apply alternative decision steps of:

1) determining the basis and determining representation coefficients of the basis;
2) updating the coefficients and the basis, in an iterative manner.

In the first step, we determine a representation of each training matrix column using the current basis vectors. This can be done using a matching pursuit method, such as orthogonal matching pursuit in a greedy fashion, or solving a least-squares problem.

In the second step, we compute a representation error matrix for each basis vector by using all other basis vectors in the set of bases vectors. We decompose the error matrix only to columns (pixel vectors) of the training matrix that use the set of current bases vectors in the representations to obtain a truncated error matrix.

For this truncated error matrix, we compute a largest eigenvalue and a corresponding eigenvector. We assign this eigenvector as the updated basis vector. We repeat this eigenvector computation for each basis vector. We then go back to first step and recomputed the representation coefficients using this updated basis vector. We repeat the alternative decision steps until a termination condition, for instance, a minimum error residual between two iterations, a maximum iteration number, is reached to produce a final basis.

We can also learn an orthonormal basis using principle component analysis (PCA) from the training matrix.

After we obtain the basis, the selected basis vectors are ordered with respect to their prominence, e.g., the total weight of their corresponding representation coefficients. The basis vectors are normalized to obtain the orthonormal basis.

Instead of learning a full basis, we use n basis vectors, where n<k. In other words, the rank of the basis is smaller than the dimension of the vectorized patches. In this way, this basis can reconstructs the training image patches with much smaller error than a random natural image patch. This low-rank basis can efficiently approximate blocking artifacts since it is trained with a step training image.

Our intuition is that a block depicting blocking artifact can be reconstructed using a minimal number of basis vectors. Note that, any natural image patch can be represented by the full basis with no error if all full basis vectors are used in the representation.

The full basis 105 we use can determine from a discrete cosine transform, a discrete Fourier transform, or a wavelet transform of the patch. We can also use a principle component analysis to determine the full basis.

In the prior art, a large number of basis vectors are typically used, e.g., 18, with an additional full-rank DCT basis as an initial structured dictionary. Our observation is that learning a large number of bases does not substantially improve the appearance of the image, despite its high computational load.

Above, we describe how to obtain a single basis. To remove blocking artifacts, we process all patches (same size used in training, e.g. 8×8) in a given input image.

We first project the pixel vector of each patch onto the basis vector we learned. We then take the transpose 165 of the pixel vector and project the vectorized form of the transpose onto the same basis. We also project the patch onto the full basis. Thus, we have three projections; two onto the basis we learned and one onto the full basis. For each projection, we determine the corresponding representations.

We then select 170 an optimal basis for each patch. We compute an error score between the patch and its representation using the maximum number of coefficients set for that basis. We set that the maximum coefficient number of the full basis larger than the maximum number of the learned bases. We select the basis that gives the minimum error as the optimal basis.

The reason the full basis reconstruction is allowed to have a larger number of non-zero coefficients is that the non-vertical and non-horizontal edges that do not contain blocking artifacts cannot be otherwise accurately represented by the full basis. To achieve accurate representation of such edges we set the maximum number to be larger than the trained basis.

The smaller values of the maximum coefficient number of the learned bases generate sparser representations and improve the computational speed of the method.

We apply a threshold to the coefficients of the optimal basis to determine a filtered representation for each patch.

The patches containing vertical and horizontal blocking artifacts arc expected to cause the selection of the optimal learned. Since that basis fits better to such artifacts, the number of significant coefficients is small in comparison to the coefficients from the full basis for the same patch.

As described above, the blocking artifacts have small gradients are visually annoying due to consistent arrangement of these gradients. The correct edges have high gradients. Thus, the threshold operation removes small coefficients, in other words, blocking artifacts of "false edges" while keeping the correct edges.

We select the value of the threshold for the coefficients of the optimal basis according to the desired level of artifact reduction. In case of slight reduction, we set the threshold value low, thus many coefficients are used in the reconstruction. For a more aggressive filtering, we set the threshold value high.

Finally, we generate a reconstructed patch using the filtered representation for each patch, and aggregate the reconstructed 190 patches to produce then output image 152.

Other orientations, such sloping edges can also be contained in the training images. In such cases, special effects are obtained after the filtering.

Dual Subspace Bases Learning

We can learn two subspace bases using the same training image 101. We provide three alternative methods, as shown in FIGS. 1B, 1C and 1D respectively.

Figure 1B:
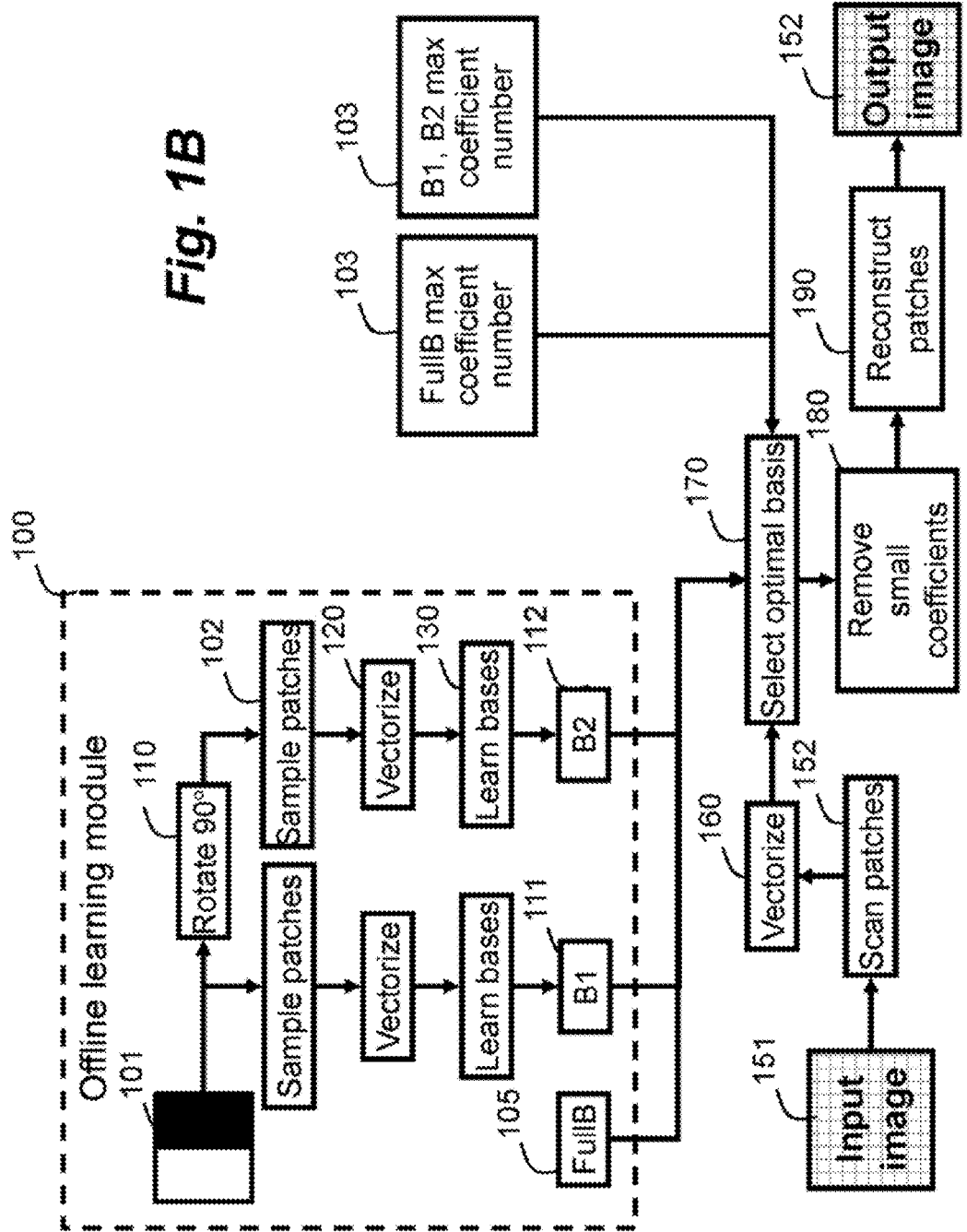

FIG. 1B—We rotate 110 the training image and learn the second basis using the patches sampled from the rotated image using the method for single basis as described above. Hence, the first and second bases are orthogonal to each other. For example, the first basis can represent a vertical edge, and the second basis can represent a horizontal edge. This process is shown in FIG. 1A.

Figure 1C:
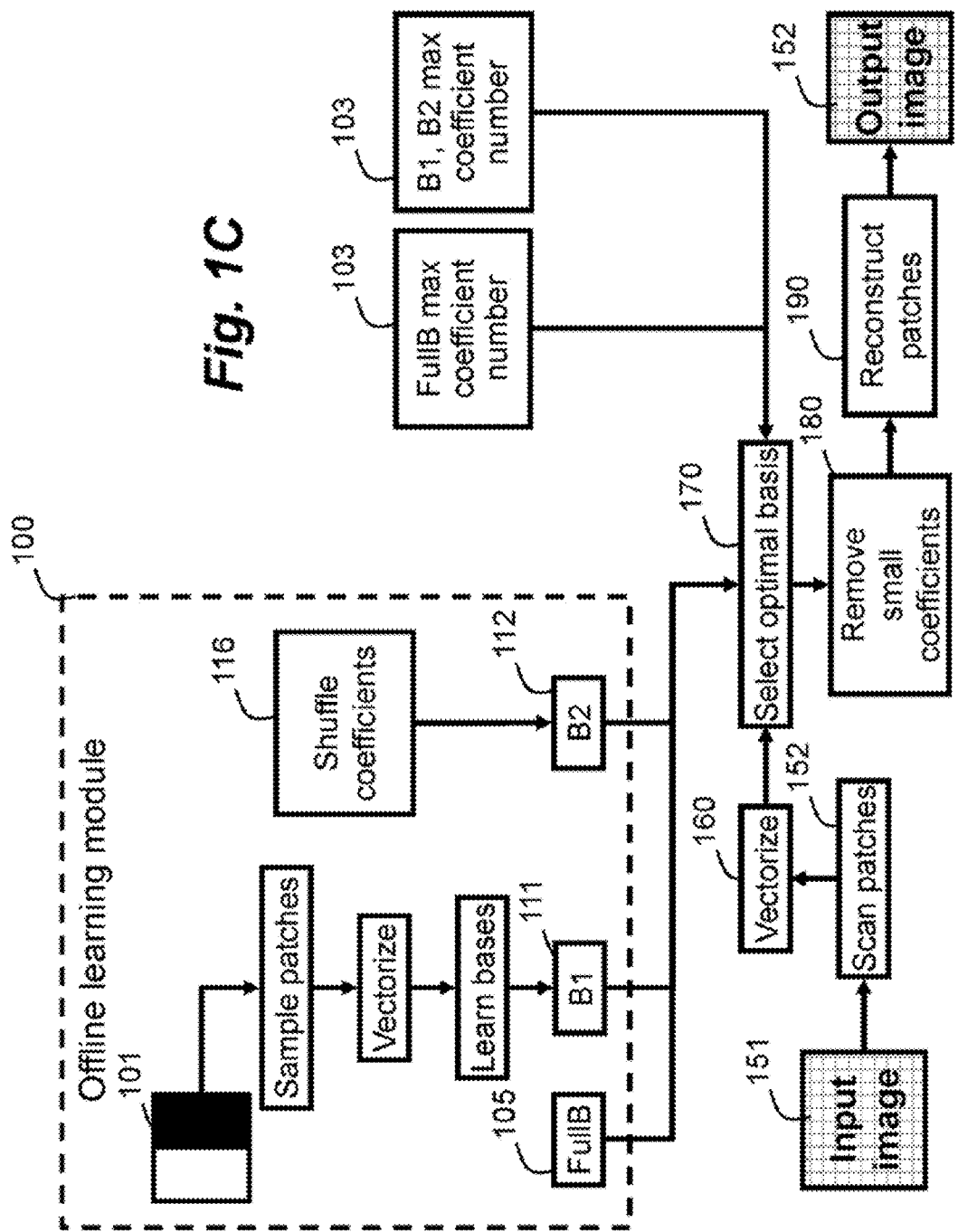
Figure 1D:
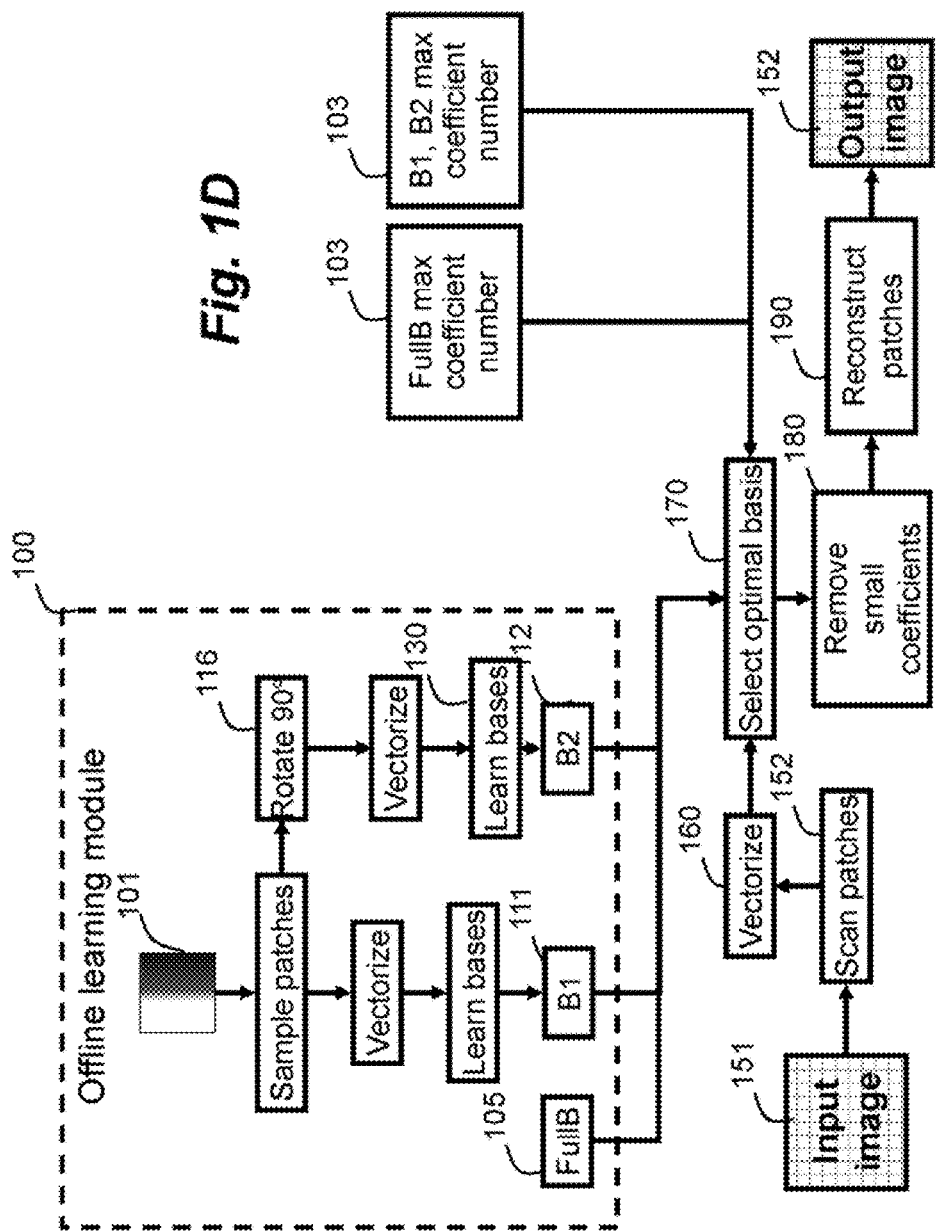

FIG. 1C—We learn a single basis as described above. After this, we shuffle 116 the coefficients of the learned basis as shown in FIG. 3 to obtain the second basis.

Figure 3:
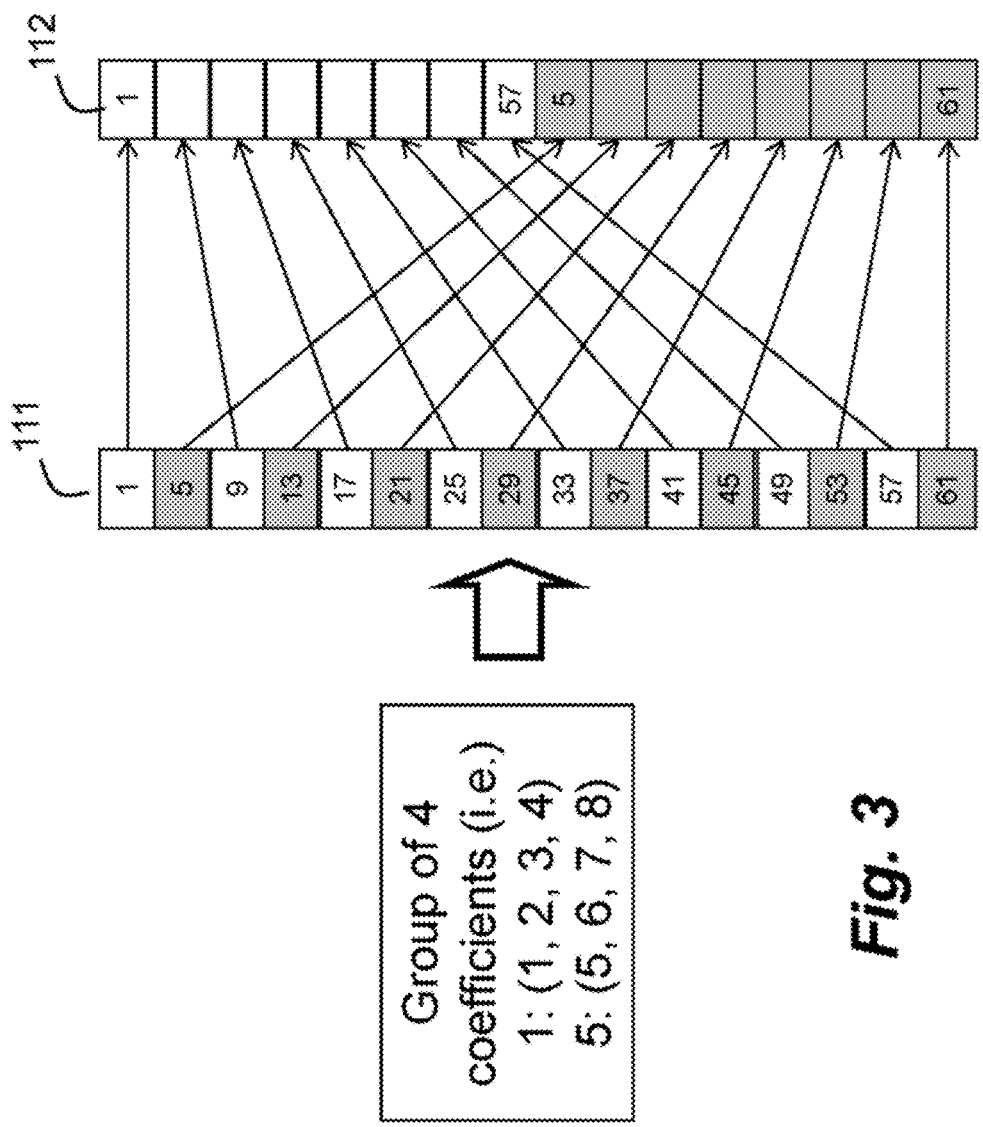
FIG. 3 is a schematic of a shuffling operation used by one embodiment of the invention.

FIG. 3 shows shuffling process in case the training image is a vertical step and 8×8 patches are vectorized using zig-zag ordering.

FIG. 1D—We learn the second basis using the rotated 118 versions of the sampled patches of the training image.

For these dual bases methods, we do not take the transpose of an image patch when we determine the optimal basis as shown in FIG. 1A.

Deblocking

Our intuition is that blocking artifacts are less noticeable than real edges in images of natural scenes. Therefore, thresholding of smaller coefficients can remove the blocking artifacts.

The bases can be used to decode an input (compressed) image 151 to output a quality reconstructed output image 152 that has reduced blocking artifacts.

In other words, magnitudes of the artifacts, when projected on the bases we learned offline (and adapt online in one embodiment), are not as large as those of the real edges.

Adaptive changes in the image patterns are more prominent for the less important basis vectors. Sign changes are reflected by the reconstruction coefficients.

By applying an optimal threshold, the method performs like a low-pass filter on the blocking artifacts.

A patch x is approximated ("^") by $\hat{x}$ as follows:

$$\hat{x} = B_k^r \delta_\tau((B_k^r)^T x), \quad (2)$$

where B is a basis vector, r is larger than the number of coefficients d used for clustering, the threshold $\delta_\tau$ is applied on each element in the vector, and T is a transpose operator. More precisely, $\delta_\tau(a)=a$, if $|a|>\tau$; and $\delta_\tau(a)=0$ otherwise.

This process is applied to all overlapping patches, and the thresholded approximations are averaged at each pixel to reconstruct the output image.

Parameter Selection

A size in of the patch can be, e.g., 8×8=64, and the number d of the basis vectors is also 8. After r>15 for the 8×8 blocks, the reconstruction improves minimally. Thus, we set r=20 to reduce the computational load.

The threshold $\tau$ is adaptive to the compression rate. We provide the following example values for $\tau$ in Table 1.

| Quality | 34 | 30 | 25 | 20 | 16 | 12 | 9 | 6 |
|---------|----|----|----|----|----|----|----|----|
| $\tau$ | 9 | 12 | 15 | 18 | 21 | 30 | 36 | 45 |

Quality is an integer parameter of a MATLAB function imwrite, which scales from 0 to 100. Higher numbers mean higher quality, i.e., less image degradation due to compression. This quantity can be determined by the compressed image. Any number near the recommended value works sufficiently well. We can even adjust these values for the image, e.g., if the image contains many textures, then a smaller $\tau$ is used. If the image is substantially uniform, then we use a larger threshold.

The iterations continue until convergence, i.e., improvements are marginal, and the number of clusters (bases are sufficient.

Our evaluation shows that using five or more iterations, and a large number of clusters, does not decrease the blocking artifacts.

Online Processing

We can update the offline-learned basis using the given input image.

The online processing shown in FIG. 2 is similar to the offline processing. However, in this case the process operates on the input image 151. Patches are sampled 202 and vectorized 202 as before. Clusters 210 of patches obtained from the offline module 100 and the patches from the input image are used to update the single or dual bases, depending on the embodiment.

We sample multiple patches from the given input image and vectorize the patches as before.

Optimal bases are selected 170 from bases 111-112 and 105, and the bases with small coefficients are removed 180. The remaining bases are then used to reconstruct the patches in the decompressed output image 152.

Each sample patch is then assigned to an optimal basis, one of the three bases (dual-bases and full) by:

$$\hat{k}(x) = \operatorname{argmax}_k \|(B_k^d)^T x\|_2^2, \quad (1)$$

where $B_k$ is an orthonormal basis of the $k^{th}$ bases, and $B_k^d$ are the first d components of the basis, where for k=1, 2, ..., $B_k$ spans the $k^{th}$ bases for the corresponding cluster. The maximum number of components d depends on the basis.

After the above assignment, we obtain a cluster of patches. For each image patch, we select 170 the optimal bases, and use the patches of the selected bases to update the corresponding bases.

We update 220 the learned bases with the corresponding cluster of patches the assigned patches. We initialize k basis vectors from the cluster and apply alternative decision steps of:

1) determining the basis and determining the representation coefficients: and 2) fixing the representation coefficients and updating the basis, in an iterative manner.

In the first step, we determine a representation of each cluster patch using the current basis vectors. This can be done solving a least-squares problem. In the second step, we compute an overall representation error matrix for each basis vector by using the remaining basis vectors in representation. We decompose this representation error matrix only to training matrix columns that use the current basis vector in their representations to obtain a truncated error matrix. For this truncated error matrix, we apply a Singular Value Decomposition (SVD) to compute the largest eigenvalue and the corresponding eigenvector. We assign this eigenvector as the new updated basis vector. We repeat this eigenvector computation for each basis vector. We then go back to first step and recomputed the representation coefficients using this updated basis. We repeat the alternative decision steps until a termination condition is reached.

After convergence, we assign coefficients 103 to the basis to construct the final basis.

It suffices to use only a very small (one or two) number of bases using our method. The updating can also be optional.

Effect of the Invention

The invention is based on the realization of single or dual bases projection, and reapplication of DCT methods, which share a common point of processing of all overlapping patches in the input image.

However, our bases learning has an advantage of providing an adaptive projection, rather than spanning with a fixed orthonormal bases as in the prior art.

When sparsity is imposed, spanning onto a data and application driven basis, produces better reconstruction results. Thus, instead of using the DCT, we incorporate the bases when we reassemble and aggregate patch responses. Each basis is obtained offline by under-complete bases learning on predetermined edge orientations.

FIG. 5 shows example input and output images for the well-known "Lena" image. This image is the most widely used test image for all sorts of image processing, such as compression, and denoising as described herein.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for reducing blocking artifacts, comprising:
   projecting each patch obtained from an input image onto a set of bases vectors to determine multiple representations for each patch, wherein the set of bases vectors are learned from a training image, and the bases vectors include a full basis vector, and one or two subspace bases vectors, wherein the training image is a step image;
   determining an optimal basis vector in the set of bases vectors for each patch according to the projection;
   applying a threshold to coefficients of the optimal basis vector to determine a filtered representation for each patch;
   generating a reconstructed patch using the filtered representation; and
   aggregating the reconstructed patches to produce an output image, wherein the steps are performed in a processor, further comprising:
   (a) initializing the set of bases vectors as a current set of bases vectors with the patches obtained from the training image;
   (b) determining a representation of each patch using the current set of basis vectors;
   (c) computing an error matrix for each current basis vector by using all other current basis vectors in the set of current bases vectors;
   (d) decomposing the error matrix only for the patches that use the set of current basis vector to obtain a truncated error matrix;
   (e) computing a largest eigenvalue and a corresponding eigenvector of the truncated error matrix;
   (f) assigning the eigenvector as an updated basis vector to be used as the current basis vector in a next iteration; and iterating the steps (a) through (f) for each basis vectors until a termination condition is reached.

2. The method of claim 1, wherein the full basis vector is determined by a discrete cosine transform of the patch, a discrete Fourier transform of the patch, a principle component analysis transform of the patch, or a wavelet transform of the patch.

3. The method of claim 1, wherein the two subspace bases vectors are orthogonal to each other.

4. The method of claim 1, wherein ranks of the subspace bases vectors are smaller than dimensions of the patch.

5. The method of claim 1, wherein a maximum coefficient number of the full bases vector is larger than a maximum number of any subspace basis vector.

6. The method of claim 5, wherein determining the optimal basis further comprises:
   computing an error score between the patch and the representation of the patch using the maximum number of coefficients of the subspace basis vector; and
   selecting the subspace basis vector that yields a minimal error as the optimal basis.

7. The method of claim 1, wherein the patches are overlapping in the input image, and the patches are obtained randomly.

8. The method of claim 1, further comprising:
   vectorizing pixels in each patch as a pixel vector;
   arranging the pixel vectors as columns in a training matrix; and
   applying principle component analysis to the training matrix to determine the two subspace bases vectors.

9. The method of claim 1, wherein the input image is obtained from a compressed image.

10. The method of claim 1, wherein a subspace is a set of bases vectors linearly dependent on each other.

11. The method of claim 8, wherein the pixel vectors are obtained according to a predetermined scanning order.

12. The method of claim 1, wherein the optimal basis vector is determined from the patch and a transpose of the patch.

13. The method of claim 1, wherein the threshold is selected with respect to a desired level of artifact reduction.

14. The method of claim 1, wherein a first subspace basis vector is learned directly from the patches obtained from a training image, wherein the first subspace basis vector has coefficients, and the second subspace basis vector is learned by shuffling the coefficients.

15. The method of claim 1, wherein the projecting is adaptive.

* * * * *